United States Patent [19]

Jaworski

[11] Patent Number: 4,603,409

[45] Date of Patent: Jul. 29, 1986

[54] MARINE SEISMIC ACOUSTIC SOURCE

[76] Inventor: Bill L. Jaworski, 1257 S. Yank Ct., Lakewood, Colo. 80228

[21] Appl. No.: 614,473

[22] Filed: May 29, 1984

[51] Int. Cl.⁴ .......................... G01V 1/04; H04R 1/02
[52] U.S. Cl. .................................... 367/146; 181/120
[58] Field of Search .............. 181/115, 118, 119, 120; 367/144, 146

[56] References Cited

U.S. PATENT DOCUMENTS

| 4,114,723 | 9/1978 | Paitson et al. | 181/120 |
| 4,131,178 | 12/1978 | Bouyoucos | 181/120 |
| 4,139,835 | 2/1979 | Cholet et al. | 367/146 |
| 4,185,714 | 1/1980 | Pascouet et al. | 181/120 |
| 4,196,788 | 4/1980 | Sciard | 181/120 |
| 4,234,052 | 11/1980 | Chelminski | 181/120 |
| 4,294,328 | 10/1981 | Cholet et al. | 367/146 X |
| 4,303,141 | 12/1981 | Pascouet | 181/120 |

FOREIGN PATENT DOCUMENTS

| 2388284 | 12/1978 | France | 367/146 |
| 423075 | 9/1974 | U.S.S.R. | 181/118 |

OTHER PUBLICATIONS

Bill Jaworski, The Development and Evaluation of a New Marine Seismic Energy Source, The HP Water Gun, Thesis, Univ. Wisconsin-Milwaukee, Apr. 1975.

Primary Examiner—Charles T. Jordan
Assistant Examiner—Brian Scott Steinberger

[57] ABSTRACT

An acoustic source for seismic exploration in a water environment consists of an elongated cylindrical housing, closed at both ends and containing laterally disposed exhaust ports. A reciprocable piston and piston follower are slidably mounted within the housing for reciprocal movement. Pressurized hydraulic fluid is admitted to one end of the housing, forcing the piston follower to contact the piston and move towards the opposite end of the housing. A pneumatic latching device retains the piston proximate opposite cylinder end and pressurizes the system. The hydraulic fluid is drained, allowing the piston follower to return to its original position. During the return trip of the piston follower, water is ingested through the exhaust ports to the chamber between the piston and the piston follower. A triggering mechanism then releases the piston that is accelerated towards the piston follower, to impulsively expel the contained water. The ejected water creates a momentary cavity in the surrounding water. The cavity implodes, generating the acoustic signal.

6 Claims, 7 Drawing Figures

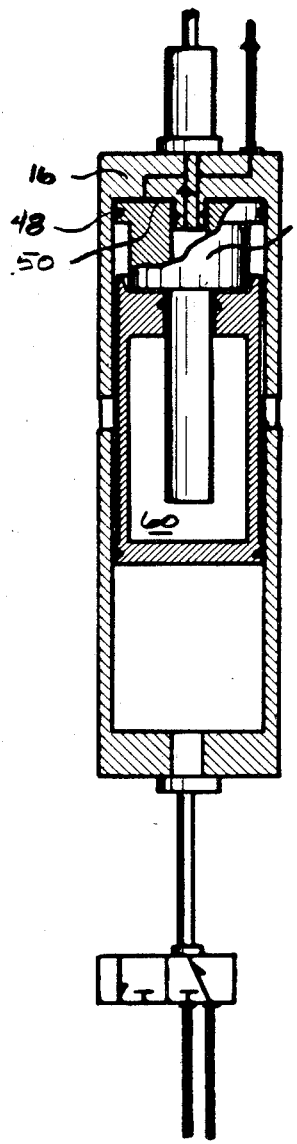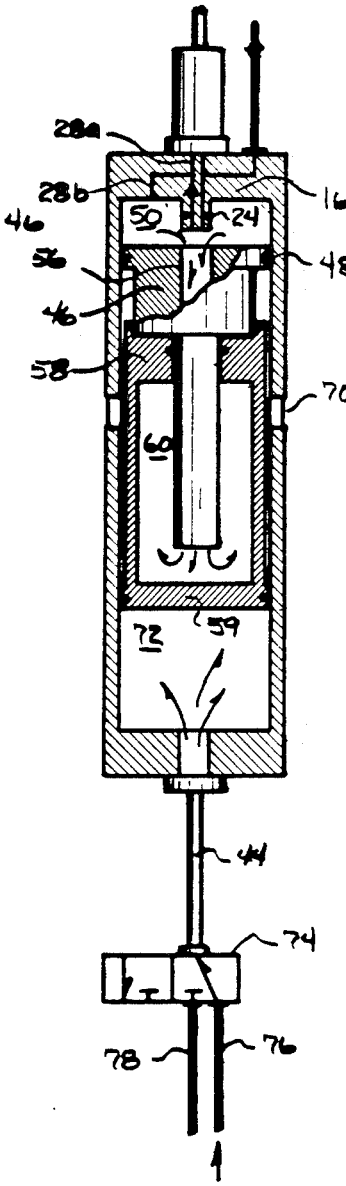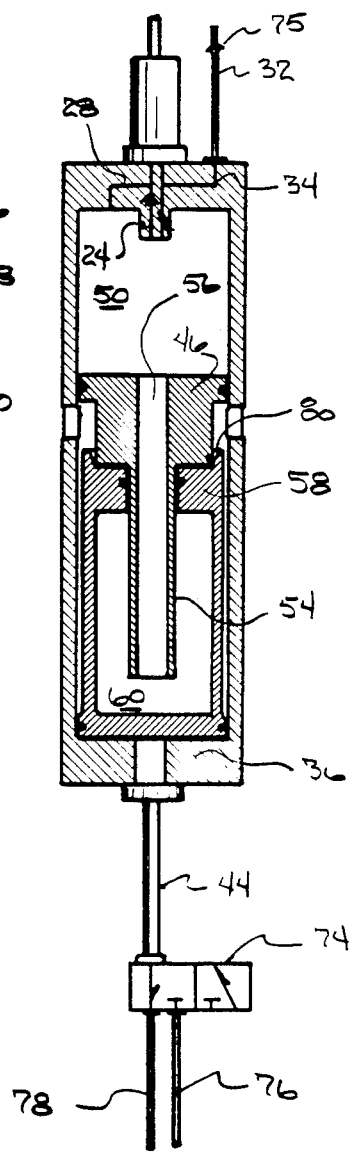

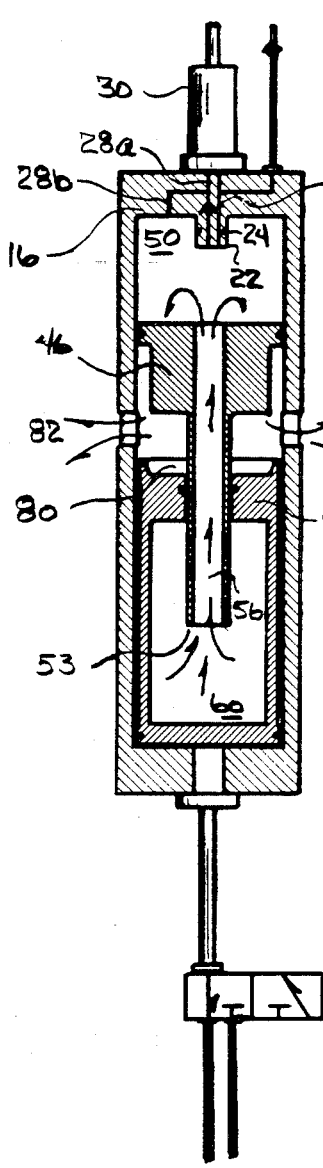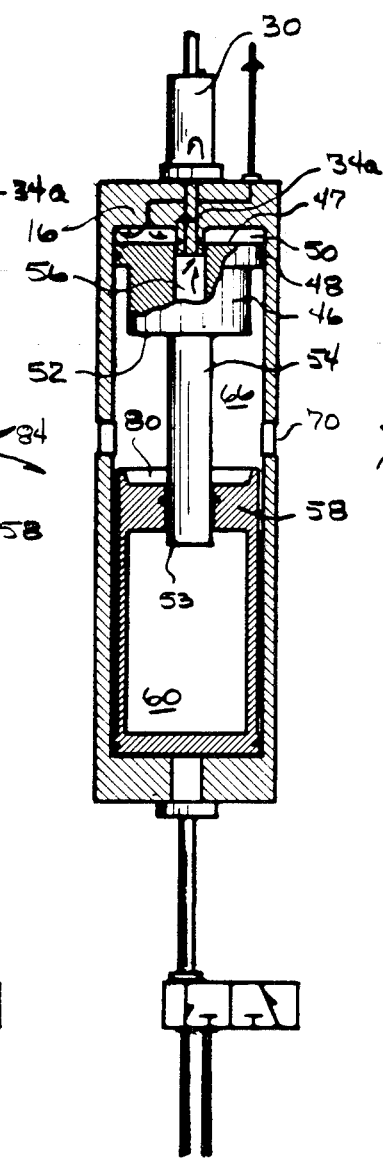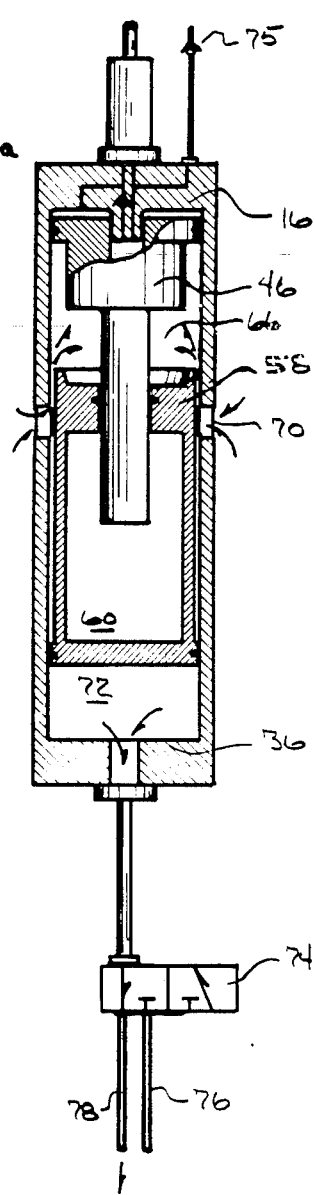

MARINE SEISMIC ACOUSTIC SOURCE

BACKGROUND OF THE INVENTION

1. Field of the Invention

This invention relates to a water gun for use as a seismic acoustic source at sea, wherein a high-velocity water jet is injected into the surrounding water. The momentum of the water jet creates a cavity in the surrounding water which implodes to create an acoustic wave.

2. Description of the Prior Art

In general water guns used for seismic exploration consist of a housing having at least one closed end. A reciprocally sliding piston divides the housing into two parts: A closed firing or compression chamber and a water-charge chamber, which may or may not be free-flooding, for containing a volume of water. In use, a restoring force causes the piston to retract into the compression chamber against a pneumatic or hydraulic spring system, where the piston is releasably locked into place. Upon command, the piston is released. Under the urging of the spring system, the piston impulsively drives the volume of water from the water-charge chamber as a jet-like water slug. The ejected water slug creates a momentary cavity in the surrounding water. A sharp acoustic pulse is generated when the cavity collapses.

There are a number of patents for water guns, all of which are based upon the principle above described. Variations in the known design of water guns are directed towards improvements in the acoustic signature of the gun and towards mechanical simplicity and reliability. Typical patents will now be discussed.

U.S. Pat. No. 4,131,178 describes a water gun that consists of a cylindrical housing closed at both ends. A sliding piston divides the interior of the housing into two chambers. One chamber, the air chamber, receives air under pressure. The other chamber, the water chamber, receives a volume of water having a pressure greater than the pressurized air. The housing includes an exhaust port that communicates with the water chamber; the exhaust port is closed by a slidable sleeve valve. In operation, with the sleeve valve closed, pressurized water is forced into the water chamber, driving the piston towards one end of the housing to further compress the air in the air chamber. Upon command, the sleeve valve opens the exhaust port, allowing the pressurized water to begin to escape, thereby reducing the pressure working against the piston. The air pressure in the air chamber therefore causes the piston to abruptly eject the water from the water chamber to create the desired water jet. I have found by observation that the gun in U.S. Pat. No. 4,131,178 appears to have certain serious mechanical problems, such as shuttle binding, leakage around the sleeve valve and inadequate shuttle damping.

U.S. Pat. No. 4,185,714 teaches a water gun having two differential-area pistons connected by a piston shaft to form a piston assembly. The piston assembly is set and triggered pneumatically by a set of valving devices in an upper chamber. The lower portion of the gun housing includes a free flooding water chamber which is sealed off from the upper chamber by the lower piston of the piston assembly. When triggered, the piston assembly is abruptly driven downwardly by an air spring in the upper chamber, thereby forcibly ejecting the slug of water contained in the lower portion of the housing. One of the drawbacks to that gun is its mechanical complexity as well as its inherent operational sluggishness.

U.S. Pat. No. 4,234,052 like U.S. Pat. No. 4,131,178, employs a slug of pressurized water to provide a means for recharging an air spring in an air chamber. In operation, gas under pressure is applied to an operating chamber against a reciprocal shuttle to cause the shuttle to close a charge chamber having a discharge port. Water is pumped into the charge chamber to push a piston follower into an energized piston against a pneumatic spring in an air chamber for recharging the penumatic spring. When the air pressure on opposite sides of the operating piston is equalized, the piston follower is driven towards the discharge port to eject the water therefrom. Unlike U.S. Pat. No. 4,131,178, the pneumatic springs form a closed system.

U.S. Pat. No. 4,303,141 provides a water gun consisting of a housing having a discharge port that is in communication with the surrounding water. A first and a second shuttle are slidingly mounted inside the main housing. The first shuttle in combination with the housing forms a water chamber for containing a volume of water. A force producing means cyclically cause the shuttles to move away relative to each other, or in locked condition with each other so that by applying an brupt propulsive source during each cycle of operation, the contained volume of water is expelled through the discharge port.

The latter two water guns are very complex and, because of their physical size, are difficult to handle. I have found, through actual observation of many existing water guns that the moving parts, pistons, and shuttles are inadequately damped at the end of an operating stroke. Many of the known guns self-destruct under the large forces that develop during operation.

It is an object of this invention to provide a simple, compact water gun that operates as a closed system to avoid the necessity for excessive replenishment of pressurized operating fluids. Further objects are to provide for rapid cycling of the gun by using relatively lightweight parts and to provide adequate cushioning for those moving parts that must intimately interact with each other during operation.

SUMMARY OF THE INVENTION

In accordance with a preferred aspect of this invention, a water gun includes an elongated cylindrical housing that has first and second end walls and a laterally-disposed water discharge port. Within the housing, there is mounted a piston and an associated piston follower assembly both of which are slidingly disposed for reciprocal motion within the housing. The piston is nestable within the piston follower. A conduit is mounted in the second end wall of the housing to cyclically admit a pressurized fluid into the volume between the piston follower and the second end wall. Application of the pressurized fluid forces the piston and piston follower into a nestable configuration and drives the nested piston and piston follower towards the first housing end wall. A suction chamber formed between the piston face and the first end wall, detachably latches the piston proximate the first end wall. A pneumatic reset means in cooperation with the pressurized fluid admitting means then disengages the piston follower from its nesting configuration with the piston and drives the piston follower back towards the second end wall. During its return trip, the piston follower ingests water, through the discharge port which is contained in the volume in the housing between the latched piston and the piston follower. In sequential cooperation with the pressurized-fluid admitting means and the pneumatic reset means, a triggering means inflates the suction chamber to release the piston which is accelerated towards the piston follower, to impulsively expel the contained water.

BRIEF DESCRIPTION OF THE DRAWINGS

A better understanding of the benefits and advantages of my invention may be obtained from the appended detailed description and the drawings, wherein:

FIGS. 2 through 7 schematically illustrate the operational sequence of this invention.

DETAILED DESCRIPTION OF THE PREFERRED EMBODIMENT

Figure 1:
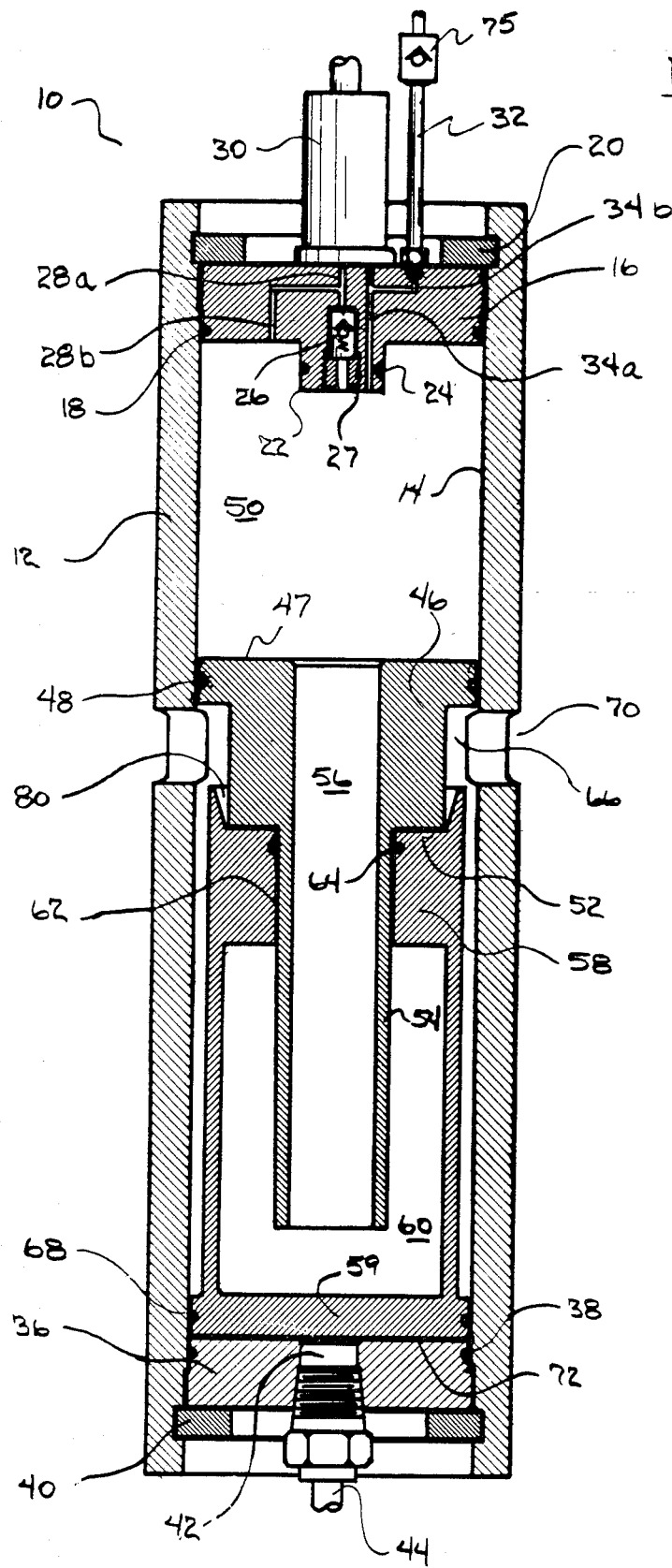
FIG. 1 is a schematic longitudinal cross-section of this invention.

FIG. 1 is a schematic cross-section of water gun 10 consisting of a cylindrical housing 12 including a bore 14 extending therethrough. The upper end of bore 14 is sealed by a first end wall 16 and seal 18, and is retained by shear ring 20. A retaining boss 22 with annular seal 24 is mounted inside end wall 16. Retaining boss 22 communicates with a suitable check valve 26 mounted within fluid passage 28a that is coupled to a normally closed solenoid valve 30. Check valve 26 is retained with boss 22 by retaining bushing 27. Fluid conduit 32 is connected to passage 34a, 34b within end wall 16. The upper end of conduit 32 is coupled to a source of compressed gas not shown.

The lower end of bore 14 is closed by a second end wall 36 and seal 38. End wall 36 is held within bore 14 by shear ring 40. Second end wall 36 includes a port 42 coupled to conduit 44 which in turn is coupled to a pressurized fluid supply not shown.

A piston 46, having an annular seal 48, is slidably disposed within the upper portion of bore 14. A gas chamber 50 is defined within bore 14 between first end wall seal 18 and piston annular seal 48. The volume of pressurized gas in chamber 50 acts as a pneumatic spring. Extending from the lower face 52 of piston 46, a tubular extension 54 defines an axial bore 56 that extends through piston 46.

Beneath piston 46, a piston follower 58 contains an inner gas-reservoir chamber 60. An aperture 62 and annular seal 64 near the top of piston follower 58 slidably receive the tubular extension 54 of piston 46. Gas chamber 50 is therefore in fluid communication with gas-reservoir chamber 60 through bore 56. A dashpot recess 80 is formed at the top of piston follower 58. The bottom wall 59 of piston follower closes the chamber 60.

A chamber 66 is defined between piston seal 48, lower piston follower seal 68, and annular seal 64 in the top of piston follower 58. Chamber 66 is maintained in fluid communication with the surrounding water through lateral water discharge ports such as 70 in housing 12.

Lower pressure-chamber 72 is defined by the variable volume between sound end wall seal 38 and the lower seal 68 of piston follower 58. Pressure chamber 72 is in fluid communication with a fluid supply via conduit 44 as described above. Any suitable fluid, such as hydraulic fluid or gas may be used. A two-position control valve 74 directs fluid flow to and from pressure chamber 72 as shown in FIG. 2.

Reference is made to FIGS. 2 through 7 to illustrate the operational sequence of this invention. Like reference numbers for like parts are used in all of the drawings. However in FIGS. 2–7 to avoid excessive detail, only those reference numbers are included that are needed to explain operation of the gun 10. Assuming any starting configuration when retaining boss seal 24 is not engaging the inner wall of axial bore 56 within piston 46, pressurized gas such as air, is supplied to gas chamber 50 through conduit 32 and passage 34. A check valve 75 is mounted in line 32 to prevent the reverse flow of gas from gas chamber 50 into supply line 32 during operation of the gun. The gas pressure forces piston 56 to nest within dashpot recess 80 in piston follower 58. Since gas chamber 50 is in fluid communication with gas-reservoir chamber 60 through tubular extension 54, the pressure increase also forces piston follower 58 against second end wall 36. Fluid in pressure chamber 72 is vented to drain 78 through conduit 44 and control valve 74 so that piston follower 58 can be reset proximate end wall 36 as shown in FIGS. 1 and 2.

Referring to FIGS. 3 and 4, arming of water gun 10 is accomplished by introducing pressurized fluid from line 76 into lower pressure chamber 72 through conduit 44 and control valve 74. The pressurized fluid acting against the lower surface of the piston follower end wall 59 forces piston follower 58 and nested piston 46 towards first end wall 16 while simultaneously compressing the gas contained in the communicating gas chamber 50 and gas-reservoir chamber 60. The pressure of the fluid in chamber 72 is substantially greater than the pressure of the pneumatic spring in gas chamber 50 when the spring is fully compressed. Normally, the gas pressure in chamber 50 will be on the order of 2,000 to 3,000 pounds per square inch. Gas chamber 50 is in fluid communication with the gas-reservoir 60 until retaining boss seal 24 engages the inner wall of axial bore 56 within piston 46. Continued motion of piston 46 towards first end wall 16 further compresses gas trapped in gas chamber 50 between retaining boss seal 24, end-wall 16, and piston seal 48. The pressure build-up in gas chamber 50 forces check valve 26 (shown in FIG. 1) to open, allowing the gas to flow through passages 28a, and 28b into gas-reservoir chamber 60. The pressure build-up in gas chamber 50 further serves to damp the motion of piston 46 and piston follower 58 toward first end wall 16. Fluid flow is halted when piston 46 contacts end wall 16 minimizing the volume of gas chamber 50 as shown in FIG. 4.

Control valve 74 is moved to the drain position as shown in FIG. 5 after piston 46 contacts end wall 16, venting pressure chamber 72 to drain conduit 78. Piston 46 and piston follower 58 begin moving toward second end wall 36 acting under the force exerted by the small quantity of gas residual in gas chamber 50 and the gas in gas-reservoir chamber 60. As the small quantity of gas trapped in chamber 50 expands a pressure differential rapidly develops between the lower pressure in gas chamber 50 and higher pressure in gas-reservoir 60. Fluid communication from gas-reservoir chamber 60 to gas chamber 50 is blocked by check valve 26 (shown in FIG. 1), closed solenoid valve 30, and retaining boss seal 24. With solenoid valve 30 closed, the space between piston seal 48, end wall 16, and retaining-boss seal 24 defines a suction chamber. The word "suction" is here used in the ordinary dictionary meaning viz: "the act or process of exerting a force upon a solid, liquid or gaseous body by reason of reduced gas pressure over part of its surface".

To fire water gun 10 after piston 46 is latched and piston follower 58 is proximate end wall 36, normally-closed solenoid valve 30 is opened, thereby connecting passageway 34a with passageways 28a and 28b. The solenoid valve 30 may be any suitable commercial valve such as a Bolt SV-1200. Compressed gas from gas reservoir 60 now inflates the suction chamber defined by piston face 47 and first end wall 16 to pneumatically release piston 46 when retaining boss seal 24 disengages bore 56. Expansion of compressed gas from gas-reservoir chamber 60 into gas chamber 50 rapidly accelerates piston 46 downward towards piston follower 58, jetting water through water discharge port 70 during travel of the piston, to form a high speed water jet as shown by the arrows 82, 84 in FIG. 7. At the lower end of its stroke, piston 46 is decelerated by a water retarden in dashpot recess 80 on the top of piston follower 58 terminating the water jet. The rapid termination of the high speed wat jet creates a vapor cavity within the water body outside the gun housing. The vapor cavity implodes to generate a seismic signal.

At the end of the piston stroke, the water gun is ready for reset as shown in FIG. 2 and the firing cycle is repeated.

A timing means, not shown, of any desired type, is provided for cycling water gun 10 so that control valve 74 cooperates with solenoid valve 30 in the proper sequence during a firing cycle. It should be understood that gas supply line 32 provides a continuous flow to maintain the correct gas pressure in gas chamber 50. Although a closed fluid system is contemplated, some makeup gas is required to compensate for minor leakage.

For illustrative purposes, my invention has been described with a certain degree of specificity. Variations will occur to those skilled in the art but which may be included within the scope and spirit of this invention which is limited only by the appended claims.

I claim as my invention:

1. A water gun for use as an acoustic source for seismic exploration in a water environment, comprising:
   an elongated cylindrical housing having a laterally-disposed water discharge port, the housing being closed by first and second end walls;
   a piston follower slidingly mounted for reciprocal motion within said housing;
   a piston having a piston face associated with and nestable within said piston follower, slidingly disposed for reciprocal motion within said housing, said piston and piston follower being disposed for independent motion relative to each other;
   pneumatic spring means, for forcing said piston into a nesting configuration with said piston follower and means mounted in said second end wall, cooperating with said pneumatic spring means, and means for driving the nested piston and piston follower to a first position proximate said first end wall;
   pneumatic means mounted interiorly of said first end wall of pneumatically releasably latching said piston in a fixed position proximate said first end wall;
   means, in cooperation with said penumatic spring means and said means for driving, for disengaging said piston follower from the nesting configuration with said piston and for propelling said piston follower towards said second end wall, thereby ingesting a volume of water through said water discharge port from said water environment, the ingested volume of water being contained within the housing between said latched piston and said piston follower;
   means for penumatically releasing said piston so that said pneumatic spring means accelerates said piston towards said piston follower thereby to forcibly expel said contained water through said water discharge port.

2. The water gun as defined by claim 1, comprising:
   a dashpot, including a liquid retarder, for damping the motion of said piston when said piston engages said piston follower in nesting engagement.

3. The water gun as defined by claim 2, comprising:
   fluid means between said second end wall and said piston follower for damping the motion of said piston follower following disengagement from said piston.

4. The water gun as defined by claim 3 wherein said pneumatic latching means includes a suction chamber and means for inflating said suction chamber to release said piston.

5. The water gun as defined by claim 4, comprising:
   means mounted in said first end wall for admitting a volume of compressed gas into a region between said piston face and said first end wall to create a penumatic spring;
   a gas reservoir chamber, defined within said piston follower, in communication with said region through a passageway in said piston, containing a volume of gas under pressure for accelerating said piston following release thereof.

6. The water gun as defined by claim 5, comprising:
   a fluid means between said first end wall and said piston for damping the motion of said piston and piston follower when said piston and said piston follower are in nested engagement.

* * * * *